Figure 1:
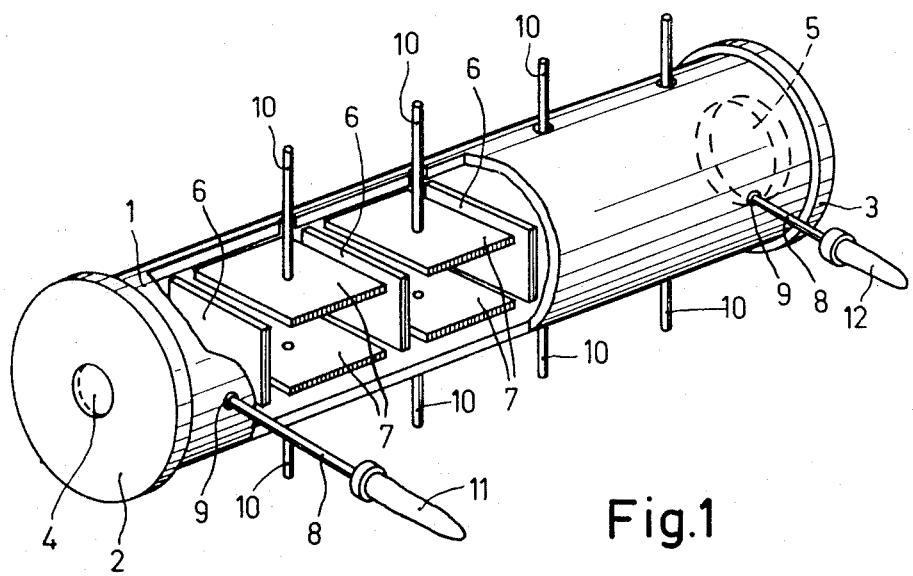

United States Patent [19]
Merz et al.

[11] 3,801,184
[45] Apr. 2, 1974

[54] CLOSED VESSEL COMPRISING A DIGITAL LIGHT DEFLECTION SYSTEM

[75] Inventors: Josef Merz, Hamburg, Germany; Johannes van Esdonk; Joannes Franciscus Maria Janssen, both of Emmasingel, Eindhoven, Netherlands

[73] Assignee: U.S. Philips Corporation, New York, N.Y.

[22] Filed: Nov. 2, 1972

[21] Appl. No.: 303,248

[30] Foreign Application Priority Data
Nov. 6, 1971 Germany............................ 2155269

[52] U.S. Cl. ............................ 350/160 R, 350/150
[51] Int. Cl. ............................................. G02f 1/28
[58] Field of Search ........................ 350/150, 160 R

[56] References Cited
UNITED STATES PATENTS
3,363,174  1/1968  Hudson et al. .................. 350/160 R
3,393,956  7/1968  Clark .............................. 350/160 R

OTHER PUBLICATIONS

"Ceramics" by Walter H. Kohl, from Mat'ls and Techniques for Electron Tubes, 1960, pp. 83–88.

Primary Examiner—Ronald L. Wibert
Assistant Examiner—Paul K. Godwin
Attorney, Agent, or Firm—Frank R. Trifari

[57] ABSTRACT

A digital light deflection system is disclosed where a group of alternating electrode pairs and prisms emersed in Kerr cell liquid is contained in a ceramic cylinder sealed at either end by a ceramic disc provided with a light-pervious window. The ceramic enclosure may be in the shape of a circular cylinder or may be a rectangular cylinder made up of rectangular plates sealed at their edges.

3 Claims, 2 Drawing Figures

CLOSED VESSEL COMPRISING A DIGITAL LIGHT DEFLECTION SYSTEM

The invention relates to a closed vessel comprising a digital light deflection system consisting of a number of prisms and a number of electrode pairs which are placed parallel according to the longitudinal axis of the system and which are present in a suitable liquid (Kerr cells).

In digital light deflection systems a number of electrodes are provided at a proportionally small distance from each other while said electrodes obtain comparatively large potential differences relative to each other. Moreover, the liquid used for the Kerr cells, in this case nitrobenzene, must be extremely pure so that no contaminations from the wall of the vessel may dissolve in said liquid. Therefore, only quartz glass seemed to be suitable as a material for the wall. Quartz glass, however, has several drawbacks. It is fragile and difficult to machine. Electrode lead-through conductors must also be passed through the quartz walls by means of intermediate glass or tubular members as a result of the large difference in coefficients of thermal expansion of quartz glass and lead-through conductors. It has furthermore been found that impurities strongly adhere to the quartz wall so that it is necessary to rinse the vessel with very pure nitrobenzene for 12 weeks so as to be able to maintain the required purity of said liquid after closing the vessel.

It has been found that the above-mentioned drawbacks can be avoided for the greater part in a closed vessel comprising a digital light deflection system consisting of a number of prisms and a number of electrode pairs placed parallel according to the longitudinal axis of the system and which are accommodated in a suitable liquid (Kerr cells) if, according to the invention, the wall of the vessel consists at least partly of a suitable ceramic material. Ceramic material which is vacuum-tight, for example, pure aluminum oxide, is preferably chosen.

The vessel may consist of a cylindrical part which is closed at the ends by means of discs which preferably also consist of a ceramic material and in which a light-pervious window is provided. However, it is alternatively possible to build up the vessel from a number of rectangular plates which are secured together with their edges by means of a suitable metal or soldering material by diffusion or soldering. The cross-section of the vessel may in that case be a polygon, preferably a rectangle. A soldering material is to be understood to mean a meltable material which readily adheres to the ceramic material and has a sufficiently low melting temperature. Particular vitreous materials are very suitable but metal-containing materials may also be used, provided they do not dissolve in the liquid present in the vessel and do not react with it.

Figure 2:
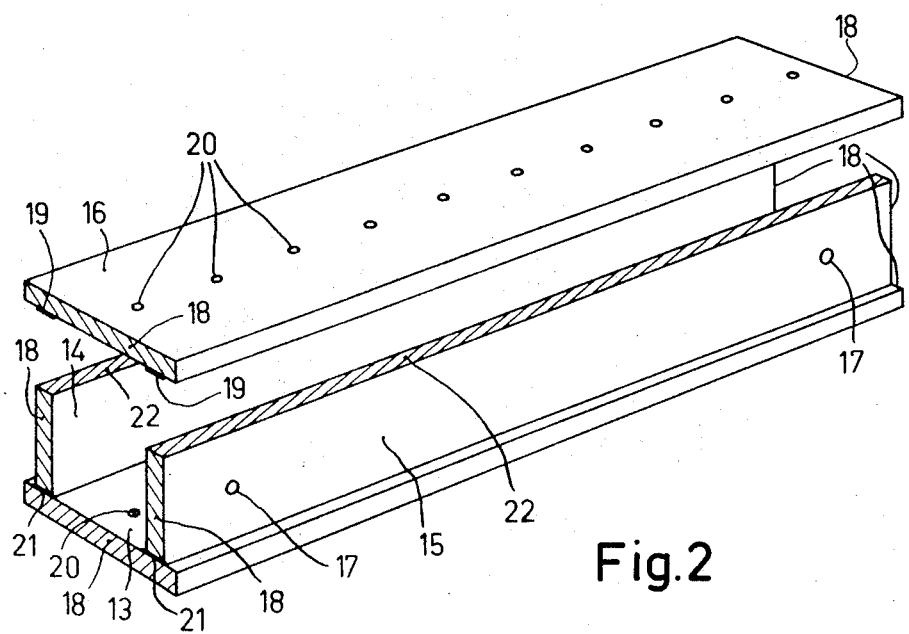

The invention will be described in greater detail with reference to the drawing, in which FIG. 1 shows, partly broken away, a vessel according to the invention having a cylindrical cross-section and FIG. 2 shows the composing parts of a vessel having a prismatic cross-section.

Reference numeral 1 in FIG. 1 denotes a cylindrical part of a vessel which consists of a ceramic material and which is closed by ceramic discs 2 and 3 in which light-pervious sapphire windows 4 and 5 are provided.

In the vessel 1 is arranged a digital light deflection system consisting of prisms 6 and Kerr cells consisting of electrode pairs which are placed parallel to the longitudinal axis of the system and which are secured to lead-through conductors 10. Furthermore, two metal exhaust tubes 8 are present.

The end faces of the cylindrical ceramic part 1, the surfaces of the closing discs 2 and 3 to be connected as well as the holes 9 for the metal exhaust tubes 8 are previously metallized, for example, by providing a layer of a mixture of 80 percent by weight of molybdenum oxide and 20 percent by weight of a mixture consisting of:

13 percent by weight $Al_2O_3$,
35 percent by weight $SiO_2$, and
52 percent by weight MnO.

This layer is burnt-in in a moist protective gas atmosphere at 1,400° C for 30 minutes in a furnace. The lead-through conductors 10 are then sealed in holes which are drilled in the wall of the part 1 at 1,300° C for 10 minutes while using a vitreous soldering material consisting of:

37 percent by weight MnO,
50 percent by weight $SiO_2$, and
13 percent by weight $Al_2O_3$.

The end faces of the part 1, the lead-through conductors 10 and the inner wall of the holes 9 for the exhaust tubes 8 are then nickel-plated (thickness nickel layer 5 to 6 $\mu$). The electrodes 7 are then provided in the part 1 of the vessel by means of moulds. The electrodes 7 are then soldered to the lead-through conductors 10 and the exhaust tubes 8 are soldered in the holes 9, for example, with silver-copper soldering material by heating in a furnace at 850° C. The prisms are then mounted in the tube. The closing discs 2 and 3 are then secured to the end faces of the wall 1 by diffusion of the nickel layers or by means of a soft-soldering material consisting of 40 percent by weight lead and 60 percent by weight tin at 450° C. The windows 4 and 5 consist of sapphire and are previously secured in the discs 2 and 3 by means of the above-mentioned vitreous soldering material at 1,300° C.

The tube is then evacuated and tested for vacuum-tightness. The liquid, in this case nitrobenzene, is then pumped into the vessel through one tube 8 and removed through the other tube 8 and the tube is thus rinsed so as to remove impurities out of the vessel. Contrary to all expectations, it has been found that when a ceramic wall consisting of $Al_2O_3$ is used, a rinsing time of 3 days is already sufficient in contrast with a rinsing time of 12 weeks which is necessary when a quartz glass wall is used. The metal tubes 8 are then sealed by means of sealed glass parts 11 and 12.

In the embodiment shown in FIG. 2, the vessel consists of a number of ceramic plates which are secured together. First the holes 17 and 20 are drilled in the plates 15, 13 and 16. The bottom plate 13 is then secured to the side plates 14 and 15 by means of a vitreous soldering material having a melting temperature of 1,500° C and consisting of:

54 percent by weight $Al_2O_3$,
38.5 percent by weight CaO, and
7.5 percent by weight MgO.

The pulverulent mixture of said substances is stirred to a thin slurry with a solution of nitrocellulose in butyl acetate. Said slurry is spread on the surfaces of the plates 13, 14 and 15 to be connected together and is dried. The plates 14 and 15 are then placed on the bottom plate 13 and the assembly is heated in a furnace at 1,500° C for 30 minutes after which the vitreous soldering material 21 resulting from the slurry has connected said plates to form a U-shaped member. The end faces 18 of the plates 13, 14 and 15 are then ground flat while using a mould. The end faces 18, the upper surfaces 22 of the plates 14 and 15 and strips 19 on the upper plate 16 and also the inner surface of the holes 17 are then metallized as described with reference to FIG. 1. Lead-through conductors 10 are then sealed in the holes 20 by means of the vitreous material described with reference to FIG. 1 which has a melting temperature of 1,300° C, after which the metallized surfaces as well as the lead-through conductors are nickel-plated. Mounting of the exhaust tubes 8 and the electrodes 7 is carried out in the same manner as described with reference to FIG. 1. The prisms, however, can now be mounted in a much simpler manner in the open U-shaped member and on the plate 16. The plate 16 is then placed on the U-shaped member and the nickel-plated surfaces 19 and 21 are connected together, for example, by diffusion or soldering.

In order to obtain the desirable measuring accuracy of the electrode distances, known measures will be taken in general, for example, providing raised fitting edges on the surfaces 21 and 19 to be connected by soldering and/or providing soldering material only over a part of the width of the edge in such manner that the thickness of the layer of solder has no influence on the distance between the bottom plate 13 and the upper plate 16.

The tube having a rectangular cross-section is then closed with circular disc-shaped or rectangular closing plates not shown, which may be made to be detachable so as to be able to perform repairs of the electrode system afterwards.

What is claimed is:

1. A digital light deflector, comprising a plurality of substantially rectangular ceramic plates connected at the major edges to form a rectangular cylinder, vacuum-tight seals at the connection areas of the plates, a plurality of substantially flat electrode pairs having parallel major surfaces and fixed in a spaced relationship along the inside of the cylinder, a plurality of prisms fixed between each electrode pair, Kerr cell liquid substantially filling the cylinder and surrounding the electrodes and prisms, and a separate light-pervious member vacuum sealed to each end of the cylinder.

2. A digital light deflector as claimed in claim 1, wherein the ceramic plates are composed of aluminum oxide.

3. A digital light deflector as claimed in claim 1, wherein each light-pervious member comprises a ceramic disc provided with a light-pervious window.

* * * * *

PO-1050
(5/69)

UNITED STATES PATENT OFFICE
CERTIFICATE OF CORRECTION

Patent No. 3,801,184          Dated April 2, 1974

Inventor(s) JOSEF MERZ, JOHANNES VAN ESDONK AND JOANNES FRANCISCUS
MARIA JANSSEN It is certified that error appears in the above-identified patent and that said Letters Patent are hereby corrected as shown below:

ON THE TITLE PAGE

"[30]     Foreign Application Priority Data

Nov. 6, 1971      Germany..........2155269"

should read

--[30]     Foreign Application Priority Data

Nov. 6, 1971      Germany............P.2155269.2--;

IN THE SPECIFICATION

Col. 1, line 12, after "other" insert a comma.

Signed and sealed this 1st day of October 1974.

(SEAL)
Attest:

McCOY M. GIBSON JR.                    C. MARSHALL DANN
Attesting Officer                      Commissioner of Patents